United States Patent [19]

Westley

[11] Patent Number: 4,542,812
[45] Date of Patent: Sep. 24, 1985

[54] VARIABLE TORQUE SLIP CLUTCH

[75] Inventor: Curtis E. Westley, St. Louis Park, Minn.

[73] Assignee: Honeywell Inc., Minneapolis, Minn.

[21] Appl. No.: 586,151

[22] Filed: Mar. 5, 1984

[51] Int. Cl.⁴ .......................... F16D 7/02; F16D 23/00
[52] U.S. Cl. .................................... 192/56 R; 192/20; 464/43; 464/46
[58] Field of Search ................. 192/56 R, 20; 464/43, 464/46

[56]  References Cited
U.S. PATENT DOCUMENTS

| 3,075,369 | 1/1963 | Swire | 464/43 |
| 3,229,793 | 1/1966 | Jacobson | 192/56 R |
| 3,447,342 | 6/1969 | Hein | 464/46 |

Primary Examiner—Edward G. Favors
Attorney, Agent, or Firm—Charles L. Rubow

[57] ABSTRACT

A variable torque slip clutch is disclosed in which first and second members configured with first and second surfaces of revolution respectively transverse to an axis are positioned for sliding contact between the surfaces of revolution. A bias spring in the form of a warped disc is positioned to urge the surfaces together and a disc shaped retainer cooperates with one of the first and second members to variably compress the bias spring. The member which cooperates with the retainer is configured with ramp surface segments having a plurality of protrusions thereon angularly spaced about the axis. The retainer is configured with tongues which engage the protrusions so as to permit rotational repositioning of the retainer relative to the member with which it cooperates only after axially displacing the retainer relative to the member.

18 Claims, 5 Drawing Figures

VARIABLE TORQUE SLIP CLUTCH

BACKGROUND OF THE INVENTION

The invention disclosed herein relates generally to mechanisms in which one member rotationally slips relative to another when applied torque exceeds a predetermined limit, and more particularly to a compact slip clutch whose slipping torque is adjustable without disassembly of the clutch mechanism.

Slip clutch mechanisms are required or desirable in a variety of applications for controlling the torque transmitted from one member to another. Examples include applications in which it is desired t prevent stalling of an electric motor in case the load being driven thereby becomes jammed, and/or in which it is desired to protect gear trains and other elements between a motor and load.

As a result of availability of improved materials and advances in motor design, motors and gear trains associated therewith have become increasingly compact, while being capable of delivering and transmitting increasing amounts of power. Such advances have made possible and created demands for further reductions in physical size. It has also become necessary to achieve greater precision in operating characteristics and parameters.

It is frequently desirable or necessary to provide a slip clutch feature in a compact and sometimes complex gear train. For such applications, the slip clutch must also be compact. In order to achieve the slipping torque precision required for some applications, it may be necessary to adjust the slipping torque after final assembly of the motor and gear train. Because of other design constraints, the slip clutch may be relatively inaccessibly located among other components. Especially in such a situation, it is desirable to be able to easily adjust the slipping torque without disassembly of the mechanism. It is also necessary for reliability that once the mechanism has been adjusted to provide the desired slipping torque, the adjustments not be subject to inadvertent changes.

It is known in relatively compact slip clutch designs to adjust the slipping torque by adding or removing shims between a retainer and a bias spring mechanism. This generally requires at least some disassembly and is undesirable for that reason. It is also known to adjust slipping torque by varying the compression of a bias spring by means of a threaded shaft or stud and mating nut. Such a design normally takes up more space along the axis of rotation than the removable shim design, and may be undesirable for that reason. In addition, the design of some gear systems is such that no shaft or stud is available for use with a torque adjusting nut.

The applicant has devised a compact slip clutch arrangement which avoids the above described disadvantages, and in which slipping torque is easily adjustable and securely maintained without requiring disassembly.

SUMMARY OF THE INVENTION

The present invention is a variable torque slip clutch comprising first and second members configured with first and second surfaces of revolution respectively, the surfaces of revolution being positioned for sliding contact with one another and being urged toward one another by a bias spring. The bias spring is variably compressed by a retainer, the retainer and the first member including ramp surface means and first engaging elements which cooperate with the ramp surface means, whereby rotating the retainer relative to the member axially varies compression of the bias spring. The ramp surface is provided with second engaging elements configured to engage the first engaging elements so as to permit rotational repositioning of the retainer relative to the first member only after axially displacing the retainer.

The ramp surface means may comprise a plurality of ramp surface segments formed on projections on the first member at the outer periphery of the surfaces of revolution. The bias spring may be in the form of warped resilient disc having an ear which extends between projections on the first member to prevent rotation of the spring. The first and secon engaging means may be forked tongues configured to engage protrusions on the ramp surface segments, the protrusions being angularly spaced about the axis.

DESCRIPTION OF THE PREFERRED EMBODIMENT

Figure 1:
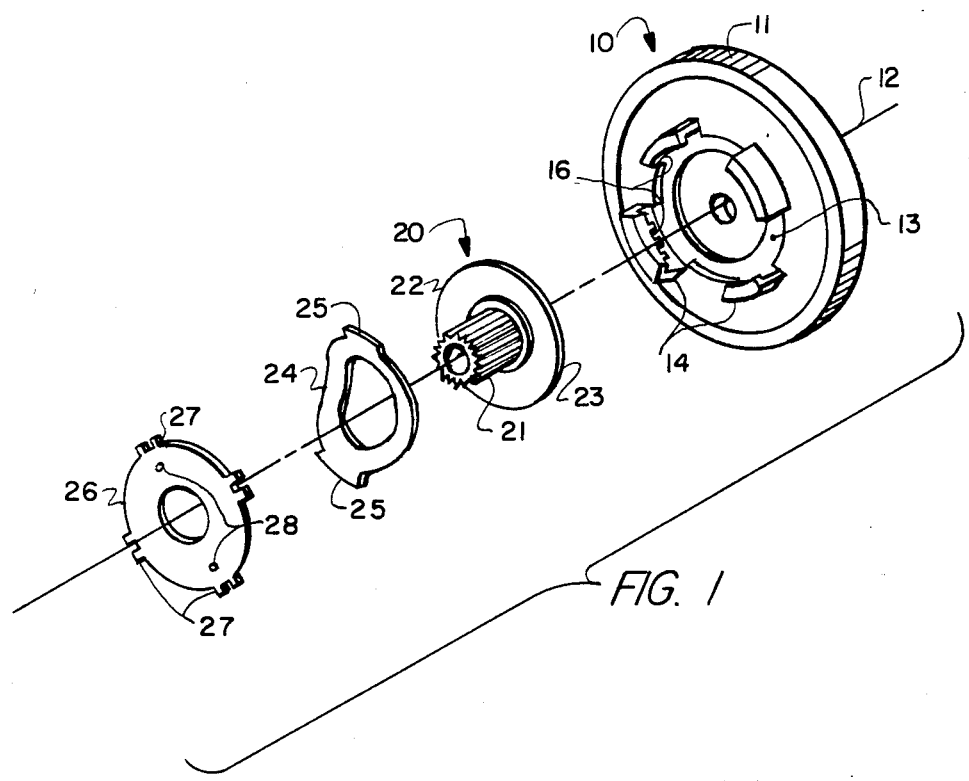
FIG. 1 is an exploded view of an adjustable slip clutch in accordance with the applicant's invention.
Figure 3:
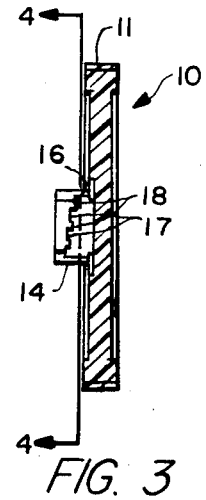
FIG. 3 is a sectional view of one of the principle elements of the slip clutch of FIG. 2 taken along line 3—3.
Figure 4:
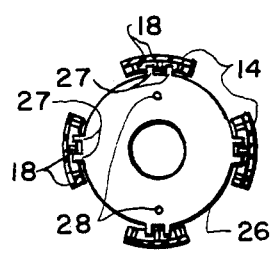
FIG. 4 is a sectional view of the slip clutch of FIG. 3 taken along line 4—4, and including certain elements omitted from FIG. 3.
Figure 5:
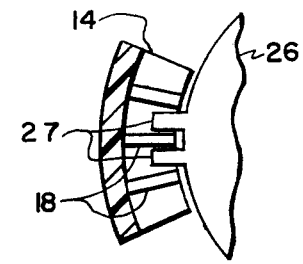
FIG. 5 is an enlarged view of a portion of FIG. 4 showing details of engaging means used in the slip clutch.

In the exploded view of FIG. 1, reference numeral 10 generally identifies a first member in the form of a gear having gear teeth 11 at its periphery. Member 10 is generally symmetrical about an axis 12, and on one side thereof has a surface of revolution 13 transverse to and symmetrical about axis 12. Member 10 is formed with a plurality of projections 14 angularly spaced around axis 12 outside the outer periphery of surface of revolution 13. Projections 14 have ramp surface means thereon comprising a ramp surface segment 16 on each of the projections. Ramp surface segments 16 face in a direction opposite surface of revolution 13 along axis 12. As can best be seen in FIG. 3, each of ramp surface segments 16 comprises a series of steps 17 at successive levels, each step being separated from adjacent steps by a protrusion 18.

Figure 2:
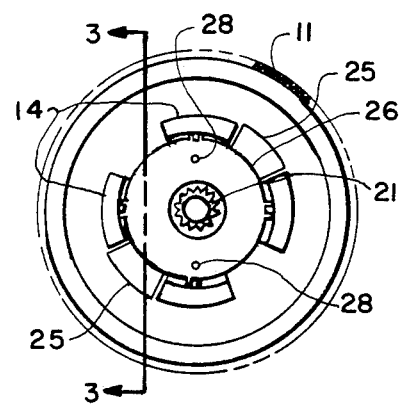
FIG. 2 is a plan view of the assembled slip clutch of FIG. 1.

Reference numeral 20 identifies a second member comprising a pinion 21 on a flange 22 having a second surface of revolution 23 thereon configured and positioned for sliding contact with surface of revolution 13. Member 20 is urged toward member 10 by means of a spring 24 in the form of a curved or warped resilient disc. Spring 24 is formed with a pair of ears 25 at its periphery configured to project between pair of protrusions 14 on member 10 (see FIG. 2) for preventing rotation of the spring 24 relative to the member. Spring 24 is held in place and variably compressed by means of a retainer 26 in the form of a disc having forked tongues 27 at its periphery configured and positioned to engage ramp surface segments 16, and more particularly to engage protrusions 18 on ramp surface segments 16.

Member 20 and spring 24 are, thus, squeezed between member 10 and retainer 26. The compression of spring 24 and resultant force between surfaces of revolution 13 and 23 can be varied by varying the position of tongues 27 on ramp surface segments 16. Accordingly, the torque at which the surfaces of revolution slip relative to one another can be adjusted.

Protrusions 18 on ramp surface segments 16 and forked tongues 27 on retainer 26 cooperate to prevent inadvertent repositioning of retainer 26 relative to member 10. However, intentional repositioning can be easily accomplished by axially moving retainer 26 toward member 10 to disengage tongues 27 from protrusions 18. Retainer 26 can then be rotated to a position which will provide the desired slipping torque. Axially releasing retainer 26 permits tongues 27 to engage protrusions 18 at a corresponding level on ramp surface segment 16. A pair of holes 28 is provided in retainer 26 to accommodate a spanner for facilitating repositioning of the retainer relative to member 10.

As is apparent from the drawings, the above described slip clutch is very compact, especially along axis 12. The slipping torque can be easily adjusted without disassembly of the clutch mechanism. Except when being repositioned, the position of retainer 26 is securely fixed relative to member 10. Thus, inadvertent changes in slipping torque adjustment are avoided. As illustrated, the applicant's slip clutch design is well adapted for use in a compact gear train. The center of the assembly is available for a variety of shaft configurations, thus providing flexibility in gear train design.

Although a specific embodiment of the applicant's invention has been shown for illustrative purposes, variations and modifications of the disclosed design will be apparent to those skilled in the relevant arts. It is not intended that coverage be limited to the embodiment shown, but only by the terms of the following claims.

The embodiments of the invention in which an exclusive property or right is claimed are defined as follows:

1. A variable torque slip clutch comprising:
   a first member having a first surface of revolution thereon transverse to an axis and facing in a first direction along the axis, said first member being configured with ramp surface means facing in a second direction opposite the first direction, the ramp surface means having a plurality of first engaging means thereon angularly spaced about the axis;
   a second member having a second surface of revolution configured and positioned for sliding contact with the first surface of revolution;
   a spring compressible along the axis; and
   a retainer configured and positioned to cooperate with the ramp surface means so as to variably squeeze said spring and said second member between said retainer and said first member, thereby varying the torque at which said second member slips relative to said first member, said retainer having second engaging means configured to cooperate with the first engaging means to permit rotational repositioning of said retainer about the axis relative to said first member only after displacing said retainer in the second direction.

2. The slip clutch of claim 1 wherein said ramp surface means includes a plurality of ramp surface segments angularly spaced around the axis.

3. The slip clutch of claim 2 wherein said ramp surface segments are formed on plurality of projections on said first member.

4. The slip clutch of claim 3 wherein said projections are located at a larger distance from the axis than the outer periphery of the first and second surfaces of revolution.

5. The slip clutch of claim 4 wherein said first engaging means comprises a plurality of protrusions on each ramp surface segment, the protrusions being angularly spaced about the axis.

6. The slip clutch of claim 5 wherein said retainer comprises a disc member and said second engaging means comprises a plurality of tongues extending from the periphery of said disc member, each tongue being forked to engage a protrusion on a ramp surface segment.

7. The slip clutch of claim 6 wherein each ramp surface segment comprises a series of steps with transitions between step levels occurring at said protrusions.

8. The slip clutch of claim 7 wherein said bias spring is configured as a resilient curved disc having an ear extending between a pair of projections on said first member so as to prevent rotation of said spring relative to said first member.

9. The slip clutch of claim 8 wherein said first and second members ar formed with gear teeth thereon around the axis, whereby the slip clutch is adapted to comprise part of a gear train.

10. A variable torque slip clutch comprising:
    first and second members configured with first and second surfaces of revolution respectively transverse to an axis, the first and second surfaces of revolution being positioned for sliding contact with on another;
    a bias spring positioned to urge said first surface along the axis toward said second surface;
    retaining means for variably compressing said bias spring against said first member;
    ramp surface means on one of said second member and said retaining means, said ramp surface means facing along the axis in the direction necessary to compress said bias spring and having a plurality of first engaging element thereon angularly spaced about the axis; and
    second engaging elements on the other of said second member and said retaining means, said second engaging elements being configured to cooperate with the first engaging elements to permit rotational repositioning of said retaining means about the axis relative to said second member only after displacing said retaining means away from said ramp surface means.

11. The slip clutch of claim 10 wherein said ramp surface means comprises a plurality of ramp surface segments angularly spaced around the axis at a diameter larger than the outer diameter of the first and second surfaces of revolution.

12. The slip clutch of claim 11 wherein said first engaging elements comprise a plurality of protrusions on each ramp surface segment angularly spaced about the axis.

13. The slip clutch of claim 12 wherein each ramp surface segment is on a projection on said second member.

14. The slip clutch of claim 13 wherein said retaining means is a disc member configured to engage said ramp surface segments.

15. The slip clutch of claim 14 wherein said second engaging elements comprise a plurality of forked tongues spaced around the periphery of said disc member, each tongue being configured to engage a protrusion on one of said ramp surface segments.

16. The slip clutch of claim 15 wherein said bias spring comprises a warped resilient disc.

17. The slip clutch of claim 16 wherein said warped resilient disc is configured with an ear at its periphery adapted to extend between a pair of said projections on said second member so as to prevent rotation of said bias spring relative to said second member.

18. The slip clutch of claim 17 wherein said first and second members are formed with gear teeth around the axis, whereby the slip clutch is adapted to comprise part of a gear train.

* * * * *

UNITED STATES PATENT AND TRADEMARK OFFICE
CERTIFICATE OF CORRECTION

PATENT NO. : 4,542,812

DATED : September 24, 1985

INVENTOR(S) : Curtis E. Westley

It is certified that error appears in the above-identified patent and that said Letters Patent is hereby corrected as shown below:

Column 4, line 27, cancel "ar" and substitute --are--.

Column 4, line 35, cancel "on" and substitute --one--.

Column 4, line 44, cancel "element" and substitute --elements--.

Signed and Sealed this

Twenty-eighth Day of January 1986

[SEAL]

Attest:

DONALD J. QUIGG

Attesting Officer

Commissioner of Patents and Trademarks